United States Patent
Kwon et al.

(10) Patent No.: US 9,242,225 B2
(45) Date of Patent: Jan. 26, 2016

(54) ADSORBENT FOR CARBON DIOXIDE, METHOD OF PREPARING THE SAME, AND CAPTURE MODULE FOR CARBON DIOXIDE

(71) Applicant: Samsung Electronics Co., Ltd., Suwon-Si, Gyeonggi-Do (KR)

(72) Inventors: Soonchul Kwon, Hwaseong-si (KR); Jeong Gil Seo, Yongin-si (KR); Hyuk Jae Kwon, Suwon-si (KR); Hyun Chul Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 22 days.

(21) Appl. No.: 13/785,277

(22) Filed: Mar. 5, 2013

(65) Prior Publication Data

US 2013/0236726 A1   Sep. 12, 2013

(30) Foreign Application Priority Data

Mar. 6, 2012  (KR) ........................ 10-2012-0023063

(51) Int. Cl.

| | | |
|---|---|---|
| B01J 20/04 | (2006.01) | |
| B01J 20/30 | (2006.01) | |
| B01J 20/06 | (2006.01) | |
| B01J 20/08 | (2006.01) | |
| B01D 53/02 | (2006.01) | |
| B01J 20/28 | (2006.01) | |
| B01J 20/32 | (2006.01) | |
| B01J 20/10 | (2006.01) | |

(52) U.S. Cl.
CPC ............. *B01J 20/3078* (2013.01); *B01D 53/02* (2013.01); *B01J 20/041* (2013.01); *B01J 20/06* (2013.01); *B01J 20/08* (2013.01); *B01J 20/103* (2013.01); *B01J 20/28004* (2013.01); *B01J 20/28083* (2013.01); *B01J 20/28097* (2013.01); *B01J 20/3204* (2013.01); *B01J 20/3236* (2013.01); *B01D 2251/302* (2013.01); *B01D 2251/304* (2013.01); *B01D 2251/306* (2013.01); *B01D 2251/402* (2013.01); *B01D 2253/112* (2013.01); *B01D 2253/1124* (2013.01); *B01D 2253/25* (2013.01); *B01D 2257/302* (2013.01); *B01D 2257/404* (2013.01); *B01D 2257/504* (2013.01); *B01D 2257/80* (2013.01); *Y02C 10/08* (2013.01); *Y10T 428/2982* (2015.01)

(58) Field of Classification Search
CPC ........ B01J 20/3078; B01J 20/06; B01J 20/08; B01J 20/28097; B01J 20/3204; B01J 20/3236; B01J 20/103; B01J 20/28083; B01J 20/041; B01J 20/28004; B01D 53/02; Y10T 428/2982; Y02C 10/08
USPC ................................................. 428/402, 403
IPC ........... B01J 20/04, 20/06, 20/08, 20/28, 20/10, B01J 20/32
See application file for complete search history.

(56) References Cited

U.S. PATENT DOCUMENTS

| 6,387,845 | B1 | 5/2002 | Masahiro et al. |
|---|---|---|---|
| 2005/0120877 | A1 | 6/2005 | Wu et al. |
| 2007/0173580 | A1 | 7/2007 | Takamura |

FOREIGN PATENT DOCUMENTS

| CN | 101844068 | * | 9/2010 |
|---|---|---|---|
| JP | 08-034607 | A | 2/1996 |
| JP | 2002-320850 | | 11/2002 |
| JP | 2002320850 | * | 11/2002 |
| JP | 2007-077199 | | 3/2007 |
| JP | 2007077199 | * | 3/2007 |
| JP | 2009073924 | A | 4/2009 |
| JP | 2010-184229 | | 8/2010 |
| JP | 2010174172 | A | 8/2010 |
| JP | 2010184229 | * | 8/2010 |
| KR | 20060079589 | A | 7/2006 |
| SU | 1657219 | | 6/1991 |

OTHER PUBLICATIONS

H.Zhao et al:Investigation of Mg modified mesoporous silicas and their CO2 adsorption capacities Solid State Sciences, vol. 14, No. 2, Feb. 1, 2012 pp. 250-257.*
Jae Chang Kim et al., "Development of New Alumina-Modified Sorbents for CO2 Sorption and Regeneration at Temperatures Below 200° C.", Fuel 90 (2011) 1465-1470.
M.R. Othman, et al., "Elevated Temperature Carbon Dioxide Capture Via Reinforced Metal Hydrotalcite", Microporous and Mesoporous Materials 138 (2011) 110-117.
E. Alpay, et al., "High Temperature Recovery of CO2 From Flue Gases Using Hydrotalcite Adsorbent", Trans IChemE, vol. 79, Part B, Jan. 2001, 45-51.
Pil Kim, et al., "Sucrose-Derived Graphitic Porous Carbon Replicated by Mesoporous Silica", Korean J. Chem. Eng., 23(6), 1063-1066 (2006).
European Search Report dated Jun. 20, 2013, issued in European Application No. 13157871.8.
Zhao, et al., "Investigation of Mg modified mesoporous silicas and their CO$_2$ adsorption capacities", Solid State Sciences, vol. 14, No. 2, Feb. 1, 2012, pp. 250-257.
Niels N. A. H. Meis, et al., "On the Influence and Role of Alkali Metals on Supported and Unsupported Activated Hydrotalcites for CO$_2$ Sorption", Ind. Eng. Chem. Res., 2010, 49 (17), pp. 8086-8093.

* cited by examiner

*Primary Examiner* — Leszek Kiliman
(74) *Attorney, Agent, or Firm* — Harness, Dickey & Pierce, P.L.C.

(57) ABSTRACT

An adsorbent for carbon dioxide may include an inorganic oxide porous structure having a plurality of mesopores and an active compound bound to the surface of the mesopores. The active compound may be selected from an alkali metal-containing compound, an alkaline-earth metal-containing compound, and a combination thereof. Various example embodiments also relate to a method of preparing the adsorbent for carbon dioxide and a capture module for carbon dioxide including the adsorbent for carbon dioxide.

12 Claims, 4 Drawing Sheets

10 nm

ADSORBENT FOR CARBON DIOXIDE, METHOD OF PREPARING THE SAME, AND CAPTURE MODULE FOR CARBON DIOXIDE

CROSS-REFERENCE TO RELATED APPLICATION

This application claims priority under 35 U.S.C. §119 to Korean Patent Application No. 10-2012-0023063, filed in the Korean Intellectual Property Office on Mar. 6, 2012, the entire contents of which are incorporated herein by reference.

BACKGROUND

1. Field

The present disclosure relates to an adsorbent for carbon dioxide, a method of preparing the same, and a capture module for carbon dioxide including the same.

2. Description of the Related Art

The emission of carbon dioxide into the air from the increasing use of fossil fuels is believed to have very serious effects on global warming. Accordingly, the removal of carbon dioxide (e.g., from flue gas generated during the combustion of fossil fuels, syngas generated due to coal gasification, and fuel gas produced due to reformation of natural gas) is being researched.

The removal of carbon dioxide from flue gas may be performed in a wet chemical absorption method, a dry chemical absorption method, an adsorption method, a membrane separation method, and the like. However, the removal of a relatively large capacity of carbon dioxide from flue gas necessarily requires an adsorbent having improved adsorption performance.

Presently-developed adsorbents include an adsorbent for a relatively low temperature (about 0° C. to about room temperature) such as MOF (metal organic framework)/ZIF (zeolitic-imidazolate framework), zeolite, carbon, and the like, one for a middle temperature (about 150 to about 400° C.) such as hydrotalcite, and the like, and one for a relatively high temperature (greater than or equal to about 500° C.) such as a metal oxide. However, these adsorbents present various problems, such as complex processes and additional costs, since the flue gas discharged during combustion needs to become cooler or hotter to remove the carbon dioxide therefrom.

SUMMARY

Some example embodiments relate to an adsorbent for carbon dioxide having a plurality of mesopores and thus a larger specific surface area and a larger pore volume. As a result, an active region on the surface of the adsorbent is increased, thereby allowing greater reactivity with carbon dioxide.

Some example embodiments relate to an adsorbent for carbon dioxide having improved thermal stability and thus a better working at a relatively high temperature.

Some example embodiments relate to a method of preparing the adsorbent for carbon dioxide and a capture module for carbon dioxide including the adsorbent for carbon dioxide. The capture module may be a filter assembly that is configured to hold and expose the adsorbent to a gas flow.

In one embodiment, an adsorbent for carbon dioxide may include an inorganic oxide pore structure (also referred to herein as an inorganic oxide porous structure) having a plurality of mesopores and an active compound bound to the surface of the mesopores. The active compound may be selected from an alkali metal-containing compound, an alkaline-earth metal-containing compound, and a combination thereof.

The mesopores may have an average pore diameter of about 2 nm to about 50 nm.

The inorganic oxide pore structure may be selected from silica, alumina, titania, zirconia, tin oxide, cobalt oxide, zinc oxide, indium oxide, nickel oxide, hafnium oxide, vanadium oxide, and a combination thereof.

The inorganic oxide pore structure may be a mesopore particle having a pore volume of about 0.1 $cm^3/g$ to about 2 $cm^3/g$.

The active compound may be a salt including a metal selected from an alkali metal, an alkaline-earth metal, and a combination thereof.

The alkali metal may be selected from lithium (Li), sodium (Na), potassium (K), rubidium (Rb), cesium (Cs), and a combination thereof. The alkaline-earth metal may be selected from magnesium (Mg), calcium (Ca), strontium (Sr), barium (Ba), and a combination thereof.

The salt may be selected from a halide, a hydroxide, a nitrate, a chlorinate, a sulfate, a phosphate, a carbonate, a carboxylate, and a combination thereof.

The active compound may be included in an amount of about 0.01 to about 3 moles based on 1 mole of the inorganic oxide pore structure.

The adsorbent for carbon dioxide may have a particle diameter size of about 0.01 micrometer to about 1 micrometer.

A method of preparing the adsorbent for carbon dioxide may include providing an acidic aqueous solution; adding an inorganic oxide precursor to the acidic aqueous solution to hydrate the inorganic oxide precursor and to obtain a first mixture; and adding a precursor of an active compound to the first mixture to obtain a second mixture. The active compound may be selected from an alkali metal-containing compound, an alkaline-earth metal-containing compound, and a combination thereof. The method may additionally include drying the second mixture to obtain a dried product; and firing the dried product.

The acidic aqueous solution may be prepared by dissolving at least one selected from an inorganic acid, an organic acid, and salts thereof in water.

The method may further include adding a surfactant to the acidic aqueous solution before adding the inorganic oxide precursor thereto to form a micelle.

The surfactant may be selected from an ionic surfactant, a non-ionic surfactant, and a combination thereof.

The surfactant may be used in an amount of about 0 to about 3 moles based on 1 mole of the inorganic oxide precursor.

The inorganic oxide precursor may be selected from an alkoxide, a halide, a boride, an oxysulfate, a nitride, a carbide, and a combination thereof.

The precursor of the active compound may be selected from a halide, a hydroxide, a nitrate, an acetate, hydrates thereof, and a combination thereof.

DETAILED DESCRIPTION

Figure 1:
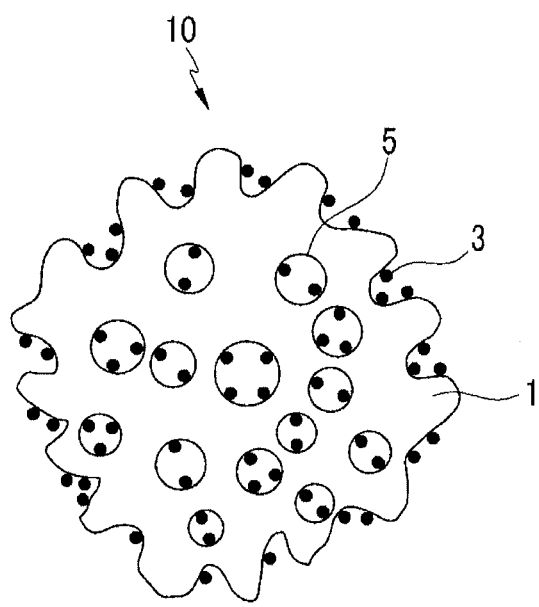
FIG. 1 is a schematic view showing an adsorbent for carbon dioxide according to a non-limiting embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Various examples will be described more fully hereinafter in the following detailed description, in which some but not all embodiments of this disclosure are described. It should be understood that this disclosure may be embodied in many different forms and is not be construed as limited to the example embodiments set forth herein.

As used herein, the term "combination thereof" may refer to a mixture, a stacked structure, a composite compound, an alloy, and the like.

Hereinafter, an adsorbent for carbon dioxide is described in more detail with reference to FIG. 1. Although the adsorbents herein are discussed primarily in the context of carbon dioxide, it should be understood that example embodiments are not limited thereto. For instance, the adsorbents herein may be used to adsorb other gases, such as $H_2O$, $NO_N$, and $SO_N$.

FIG. 1 is a schematic view showing an adsorbent for carbon dioxide according to a non-limiting embodiment.

As shown in FIG. 1, the adsorbent 10 for carbon dioxide includes an inorganic oxide pore structure 1 (also referred to herein as an inorganic oxide porous structure) having a plurality of mesopores 5, and an active compound 3 bound to the surface of the inorganic oxide defining the mesopores 5. The mesopores 5 may constitute at least 60% of the total pores of the adsorbent 10. In another instance, the mesopores 5 may constitute at least 70% of the total pores of the adsorbent 10.

The mesopores 5 may have an average pore diameter of about 2 nm to about 50 nm, and specifically about 10 nm to about 40 nm. The adsorbent 10 for carbon dioxide includes mesopores 5 and thus has a larger specific surface area and therefore a larger reaction area in which the active compound 3 is stably bound. For example, the adsorbent may have a specific surface area of about 100 to 500 $m^2/g$. The active compound 3 is bound to the surfaces of the inorganic oxide porous structure 1, including the internal surface of the mesopores 5. Accordingly, the adsorbent 10 for carbon dioxide having this structure has improved performance (capture capacity) for carbon dioxide. The adsorbent 10 for carbon dioxide having a relatively high adsorption performance for carbon dioxide may adsorb carbon dioxide generated during pre-combustion as well as during post-combustion. A conventional adsorbent needs a process of cooling down flue gas from a higher temperature to room temperature (about 23° C. to about 25° C.) to capture the carbon dioxide therefrom. However, an adsorbent 10 according to a non-limiting embodiment of the present disclosure does not need an additional temperature-lowering process and has a relatively high adsorption efficiency at a temperature region for capturing carbon dioxide, e.g., about 150° C. to about 550° C., which shows improved processibility.

The inorganic oxide pore structure 1 may be selected from silica, alumina, titania, zirconia, tin oxide, cobalt oxide, zinc oxide, indium oxide, nickel oxide, hafnium oxide, vanadium oxide, and a combination thereof, but is not limited thereto.

The inorganic oxide pore structure 1 may be a mesopore particle having a pore volume of about 0.1 $cm^3/g$ to about 2 cm$^3$/g, and specifically about 0.5 cm$^3$/g to about 1 cm$^3$/g. When the inorganic oxide pore structure 1 is in a form of a mesopore particle with a size within the above range, the adsorbent for carbon dioxide 10 may have a desirable adsorption performance.

The active compound 3 has a chemical bond (e.g., covalent bond) with the internal surface of the mesopore 5. This chemical bond, unlike physical adsorption, may stably fix the active compound 3 to the mesopore 5 and thus provide an adsorbent 10 for carbon dioxide having a desirable thermal stability. For example, the adsorbent 10 may be thermally stable at a temperature of at least 500° C. without experiencing structural decay.

The active compound 3 may be selected from an alkali metal-containing compound, an alkaline-earth metal-containing compound, and a combination thereof. The active compound 3 may be a salt including a metal selected from an alkali metal, an alkaline-earth metal, and a combination thereof.

The alkali metal may be selected from lithium (Li), sodium (Na), potassium (K), rubidium (Rb), cesium (Cs), and a combination thereof. The alkaline-earth metal may be selected from magnesium (Mg), calcium (Ca), strontium (Sr), barium (Ba), and a combination thereof.

The salt including the metal may be selected from a halide, for example, a chloride; a hydroxide; a nitrate; a chlorinate; a sulfate; a phosphate; a carbonate; a carboxylate, for example an acetate, a propionate, and the like; and a combination thereof. Examples of the active compound 3 may include a lithium halide, lithium hydroxide, lithium nitrate, lithium carbonate, a sodium halide, sodium hydroxide, sodium nitrate, sodium carbonate, a potassium halide, potassium hydroxide, potassium nitrate, potassium carbonate, a calcium halide, calcium hydroxide, calcium nitrate, calcium carbonate, and the like.

The active compound 3 may be included in an amount of about 0.01 to about 3 moles, and specifically, about 0.1 to about 2 moles, based on 1 mole of the inorganic oxide pore structure 1. When the active compound 3 is included within the above range, an adsorbent for carbon dioxide may have a desirable level of reactivity and adsorption performance. When the active compound 3 and the inorganic oxide pore structure 1 are included within the above range, an adsorbent 10 for carbon dioxide may have an alkali metal/silicon atom ratio ranging from about 0.01 to about 3, and specifically, about 0.1 to about 2.

The adsorbent 10 for carbon dioxide may have a particle diameter size of about 0.01 micrometer to about 1 micrometer and specifically, about 0.1 micrometer to about 0.8 micrometer. When the adsorbent 10 for carbon dioxide has a particle diameter size within the above range, improved adsorption process for carbon dioxide and improved adsorption performance may be acquired.

The adsorbent 10 for carbon dioxide may be prepared with a method that includes providing an acidic aqueous solution; adding an inorganic oxide precursor to the acidic aqueous solution to hydrate the inorganic oxide precursor; adding a precursor of the active compound selected from an alkali metal-containing compound, an alkaline-earth metal-containing compound, and a combination thereof to the resultant followed by drying; and firing the dried product.

Figure 2:
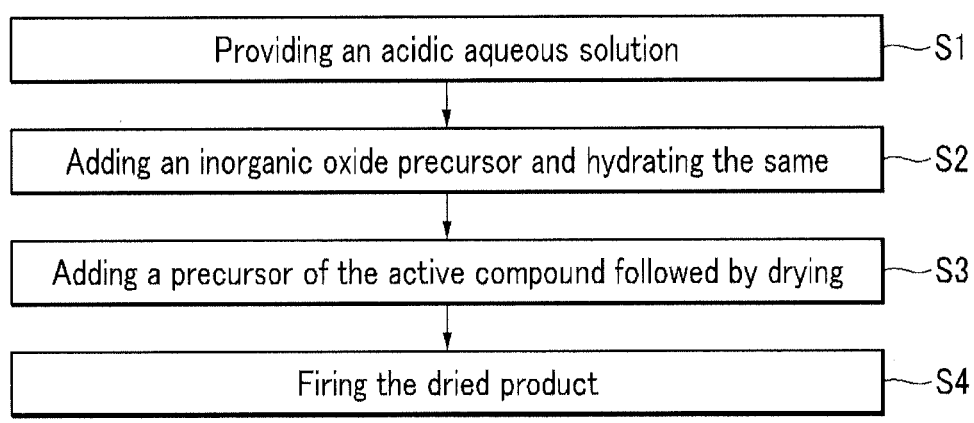
FIG. 2 is a flowchart showing a process of preparing an adsorbent for carbon dioxide according to a non-limiting embodiment.

The method of preparing the adsorbent for carbon dioxide is illustrated referring to FIG. 2.

FIG. 2 is a flowchart showing a process of preparing the adsorbent for carbon dioxide.

As shown in FIG. 2, an acidic aqueous solution is first prepared (S1).

The acidic aqueous solution may be prepared by dissolving an inorganic acid, an organic acid, or a salt thereof in water. Examples of the inorganic acid may include hydrochloric acid, nitric acid (HNO$_3$), sulfuric acid (H$_2$SO$_4$), sulfamic acid (H$_3$NSO$_3$), and the like. Examples of the organic acid may include acetic acid (CH$_3$COOH), citric acid (C$_6$H$_8$O$_7$), tartaric acid (C$_4$H$_6$O$_6$), and the like. The acidic aqueous solution may have pH ranging from about 1 to about 4.

Next, an inorganic oxide precursor is added to the acidic aqueous solution to hydrate the inorganic oxide precursor (S2).

The inorganic oxide precursor may be selected from an alkoxide, a halide, a boride, an oxysulfate, a nitride, a carbide, and a combination thereof. The inorganic oxide precursor is condensation-reacted during the hydration and forms an inorganic oxide pore structure. In a non-limiting embodiment, OH$^-$ may be removed during the condensation reaction to form a porous structure.

Examples of the inorganic oxide precursor may be selected from triethoxy silane, trimethoxy silane, tributoxy silane, titanium isopropoxide, titanium butoxide, titanium oxysulfate, titanium boride, titanium chloride, titanium nitride, tin butoxide, aluminum chloride, zinc chloride, indium chloride, zirconium chloride, nickel chloride, hafnium chloride, vanadium chloride, silicon carbide, silicon tetrachloride, silicon nitride, silicon tetraacetate, silicon tetrafluoride, silicon tetrabromide, silicon hexaboride, tetraallyl orthosilicate, tetramethyl orthosilicate, tetraethyl orthosilicate, tetrapropyl orthosilicate, and a combination thereof.

Before adding the inorganic oxide precursor to the acidic aqueous solution, a surfactant may be added to the acidic aqueous solution to form a micelle. When the surfactant is added thereto, the adsorbent for carbon dioxide may have a more uniform structure.

The surfactant may be selected from an ionic surfactant, a non-ionic surfactant, and a combination thereof.

The ionic surfactant may be selected from sodium dodecyl sulfate, sodium dodecyl benzene sulfonate, octyl trimethyl ammonium bromide (OTAB), decyl trimethyl ammonium bromide (DeTAB), dodecyl trimethyl ammonium bromide (DTAB), cetyl trimethyl ammonium bromide (CTAB), and a combination thereof.

The non-ionic surfactant may include an amphiphilic block copolymer. Examples of the amphiphilic block copolymer may include Pluronic P123 (HO(CH$_2$CH$_2$O)$_{20}$(CH$_2$CH(CH$_3$)O)$_{70}$(CH$_2$CH$_2$O)$_{20}$H made by BASF), and a polyoxyethylene ether, for example, polyoxyethylene lauryl ether, polyoxyethylene cetyl ether, polyoxyethylene oleyl ether, polyoxyethylene stearyl ether, and the like.

The surfactant may be used in an amount of about 0 moles to about 3 moles, and specifically, about 0.1 mole to about 2.5 moles based on 1 mole of the inorganic oxide precursor. When the surfactant is used within the above range, a micelle may be more easily formed.

The precursor of the active compound selected from an alkali metal-containing compound, an alkaline-earth metal-containing compound, and a combination thereof is added to the resultant and then dried (S3). The precursor of the active compound may be a salt of a metal selected from an alkali metal, an alkaline-earth metal, and a combination thereof. The salt of a metal may include a halide, a hydroxide, a nitrate, an acetate, a hydrate thereof, and the like.

The precursor of the active compound may be a composite metal salt including two or more selected from an alkali metal and an alkaline-earth metal. Examples of the precursor of the active compound may include lithium chloride, sodium chloride, potassium chloride, rubidium chloride, cesium chloride, magnesium chloride, calcium chloride, strontium chloride, barium chloride, lithium hydroxide, sodium hydroxide, potassium hydroxide, rubidium hydroxide, cesium hydroxide, magnesium hydroxide, calcium hydroxide, strontium hydroxide, barium hydroxide, lithium nitrate, sodium nitrate, potassium nitrate, rubidium nitrate, magnesium nitrate hexahydrate, calcium nitrate tetrahydrate, calcium nitrate hydrate, calcium nitrate, barium nitrate, strontium nitrate, a mixture thereof, and the like.

The drying may be performed at room temperature (about 23 to about 25° C.) for about 2 days to about 10 days.

Then, the dried product is fired to prepare an adsorbent for carbon dioxide (S4). The firing process may involve calcination. For example, the base structure may be oxidized and a block co-polymer within the pores may be removed during the firing process.

The firing process may be performed at a temperature ranging from about 400° C. to about 700° C., and specifically about 450° C. to about 600° C., for about 2 hours to about 7 hours. When the firing is performed within the above range, an adsorbent for carbon dioxide may have an improved adsorption performance for carbon dioxide, resulting from more active adsorption sites.

Hereinafter, the non-limiting embodiments are illustrated in more detail with reference to various examples. However, it should be understood that the following are merely examples and are not meant to be limiting.

EXAMPLES

Example 1

Preparation of Adsorbent for Carbon Dioxide

About 60 ml of hydrochloric acid (HCl) is added to about 380 ml of water, preparing an acidic aqueous solution. Next, about 10 g of $(PEO)_{20}(PPO)_{70}(PEO)_{20}$ (wherein PEO is polyethylene oxide and PPO is polypropylene oxide) as a surfactant is added to the acidic aqueous solution, forming a micelle. Herein, about 22 ml of tetraethyl orthosilicate is added to about 440 ml of the hydrochloric acid acidic aqueous solution for hydration. Then, about 14.6 g of KCl as the precursor of an active compound is added to the hydrated solution. The mixture is agitated at about 40° C. for about 2 days, matured at about 40° C. for 20 hours and at about 80° C. for about 20 hours, and dried at room temperature (about 24° C.) for a week. The dried resulting material is fired at about 550° C. for about 5 hours, preparing an adsorbent for carbon dioxide.

Example 2

Preparation of Adsorbent for Carbon Dioxide

An adsorbent for carbon dioxide is prepared according to the same method as Example 1, except that NaCl is used instead of KCl as the precursor of an active compound.

Example 3

Preparation of Adsorbent for Carbon Dioxide

An adsorbent for carbon dioxide is prepared according to the same method as Example 1, except that LiCl is used instead of KCl as the precursor of an active compound.

Example 4

Preparation of Adsorbent for Carbon Dioxide

An adsorbent for carbon dioxide is prepared according to the same method as Example 1, except that $Mg(OH)_2$ is used instead of KCl as the precursor of an active compound.

Comparative Example 1

Preparation of Adsorbent for Carbon Dioxide

About 10 g of $(PEO)_{20}(PPO)_{70}(PEO)_{20}$ (wherein PEO is polyethylene oxide and PPO is polypropylene oxide) as a surfactant is added to about 440 ml of water, forming a micelle. Next, about 22 ml of tetraethyl orthosilicate is added to the micelle for hydration. The resulting material is agitated for about 2 hours, matured at about 40° C. for about 20 hours and at about 80° C. for about 20 hours, and dried at room temperature (about 24° C.) for a week. The dried resulting material is filtered and fired at about 550° C. for about 5 hours, preparing an adsorbent for carbon dioxide.

Comparative Example 2

Preparation of Adsorbent for Carbon Dioxide

About 22 ml of tetraethyl orthosilicate is added to about 440 ml of water for hydration. The resulting material is agitated for about 2 hours, matured at about 40° C. for about 20 hours and at about 80° C. for about 20 hours, and dried at room temperature (about 24° C.) for a week. The dried resulting material is filtered and fired at about 550° C. for about 5 hours, preparing an adsorbent for carbon dioxide.

X-ray Diffraction Analysis

Figure 3:
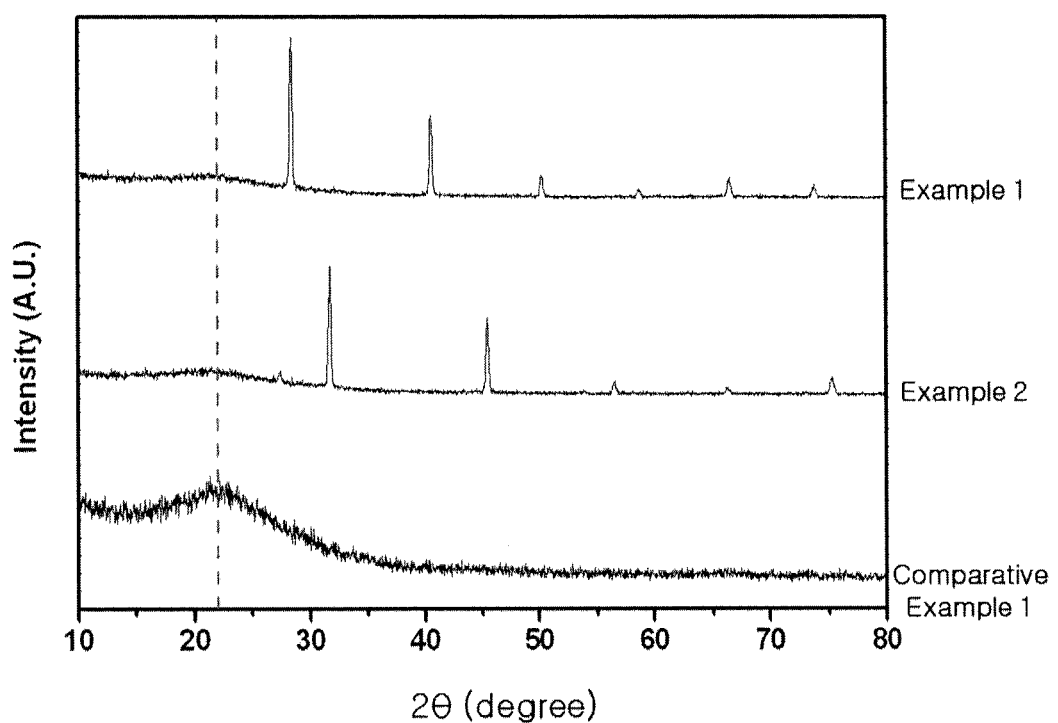
FIG. 3 is a graph showing X-ray diffraction analysis results of adsorbents according to Examples 1 and 2 and Comparative Example 1.

Each adsorbent for carbon dioxide according to Examples 1 and 2 and Comparative Example 1 is analyzed through X-ray diffraction (XRD). The results are provided in FIG. 3. The X-ray diffraction analysis is performed at 40 kV and 40 mA using Cu Ka as a light source at a scanning speed of about 0.005°/s. As shown in FIG. 3, the adsorbents for carbon dioxide according to Examples 1 and 2 are respectively observed to have KCl and NaCl crystalline peaks, while an adsorbent for carbon dioxide according to Comparative Example 1 is non-crystalline.

Pore Examination

Figure 4:
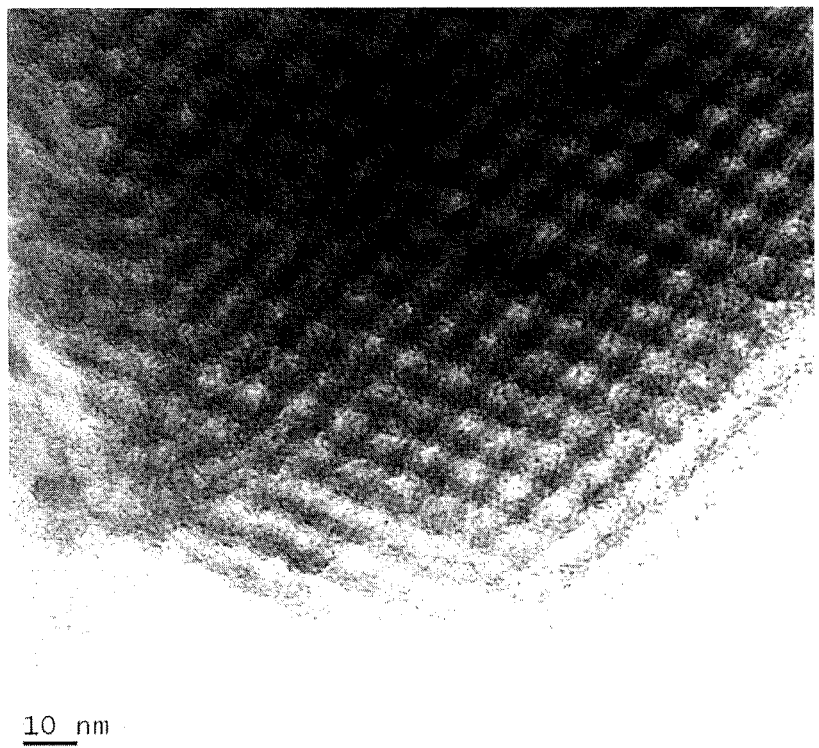
FIGS. 4 and 5 are the transmission electron microscope (TEM) photographs of the adsorbents according to Example 1 and Comparative Example 1, respectively.
Figure 5:
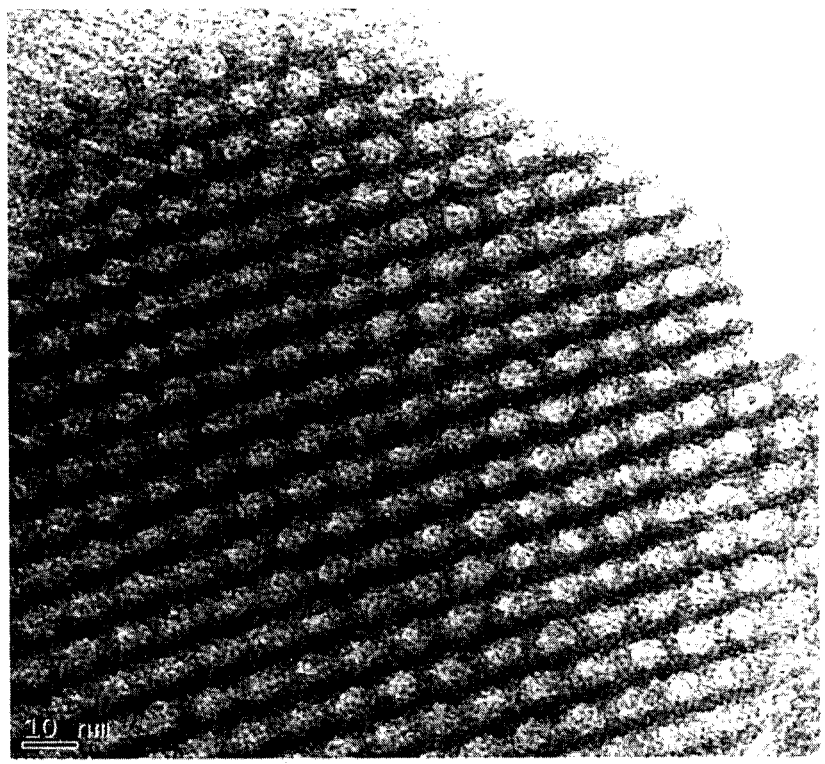

FIGS. 4 and 5 respectively show transmission electron microscope (TEM) photographs of the adsorbents for carbon dioxide according to Example 1 and Comparative Example 1. The adsorbent for carbon dioxide according to Example 1 maintains mesopores as does the one according to Comparative Example 1.

The adsorbents for carbon dioxide according to Example 1 and Comparative Example 1 are measured regarding average diameter and volume of a pore through a nitrogen adsorption/desorption isotherm reaction of XMgAl using a Tristar 3000 instrument made by Micrometrics Inc. The results are provided in the following Table 1.

TABLE 1

| Adsorbent for carbon dioxide | Average pore diameter (nm) | Pore volume ($cm^3/g$) |
| --- | --- | --- |
| Example 1 | 10.7 | 0.9 |
| Comparative Example 1 | 9.3 | 1.4 |

As shown in Table 1, the adsorbent for carbon dioxide according to Example 1 has a larger average pore diameter than the one according to Comparative Example 1 but less pore volume, which show that the pores are less deep. In a non-limiting embodiment, a ratio of the average pore diameter (nm):pore volume ($cm^3/g$) may range from 5 to 20 (e.g., 10 to 20).

About 10 mg of the adsorbent for carbon dioxide according to Examples 1 to 4 are respectively put in a 50 ml polypropylene tube, and about 1 ml of nitric acid, about 0.1 ml of HF, and about 5 ml of deionized water are added thereto, preparing a sample solution. About 1 ml of each sample solution is put in a 15 ml polypropylene tube and 10 times diluted with 10% HCl, and then analyzed regarding Si, K, and Na concentrations. In addition, about 1 ml of each sample solution is taken and analyzed regarding Li and Mg concentrations without dilution. ICP-AES (ICPS-8100 sequential spectrometer, Shimadzu Co.) is used to analyze the concentrations. The results are provided in Table 2.

TABLE 2

| Adsorbent for carbon dioxide | Si (wt %) | K (wt %) | Na (wt %) | Li (wt %) | Mg (wt %) |
|---|---|---|---|---|---|
| Example 1 | 34.51 | 12.43 | — | — | — |
| Example 2 | 28.51 | — | 10.91 | — | — |
| Example 3 | 14.55 | — | — | 4.26 | — |
| Example 4 | 32.44 | — | — | — | 7.21 |

Referring to the results in Table 2, the adsorbents for carbon dioxide according to Examples 1 to 4 additionally include each active compound other than porous silica.

Adsorption Performance for Carbon Dioxide 0.1 g of each adsorbent for carbon dioxide according to Examples 1 to 3 and Comparative Examples 1 and 2 are respectively filled into a reactor column, and a mixed gas of 10 mass % of $CO_2$/90 mass % of $N_2$ is made to flow in the reactor at a speed of 200 ml/min at 200° C. The percentage concentration of $CO_2$ is converted into mass (g) of $CO_2$ by calculating the area of the $CO_2$ concentration profile provided in a gas analyzer. The results are provided in the following Table 3.

TABLE 3

| Mixed gas (adsorption temperature) | Adsorption performance | Example 1 | Example 2 | Example 3 | Comparative Example 1 | Comparative Example 2 |
|---|---|---|---|---|---|---|
| 10 mass % of $CO_2$/90 mass % of $N_2$ (200° C.) | $CO_2$ adsorption amount per 1 g of adsorbent | 21.6 g | 14.4 g | 10.1 g | 9.5 g | 8.1 g |
|  | BT 90% $CO_2$ adsorption amount per 1 g of adsorbent | 14.3 g | 8.2 g | 6.5 g | 5.0 g | 6.2 g |

As shown in Table 3, the adsorbents for carbon dioxide according to Examples 1 to 3 have a desired level of adsorption performance compared with those according to Comparative Examples 1 and 2.

The adsorbents for carbon dioxide according to Examples 1 to 4 are evaluated regarding adsorption performance depending on adsorption temperature. About 0.1 g of each adsorbent for carbon dioxide according to Examples 1 to 4 is respectively filled in a reactor, and a mixed gas of 40 mass % of $CO_2$/60 mass % of $H_2$ is made to flow therein at about 200 ml/min at about 300° C. The percentage concentration of $CO_2$ is converted into mass (g) of $CO_2$ corresponding to 90% (breakthrough, BT) of the area of $CO_2$ concentration profile provided in a gas analyzer. The results are provided in the following Table 4.

TABLE 4

| Adsorption temperature | Adsorption performance | Example 1 | Example 2 | Example 3 | Example 4 |
|---|---|---|---|---|---|
| 200° C. | BT 90% of $CO_2$ adsorption performance | 26.3 g | 17.1 g | 14.4 g | 29.6 g |
| 300° C. | BT 90% of $CO_2$ adsorption performance | 33.1 g | 23.5 g | 16.5 g | 36.5 g |
| 400° C. | BT 90% of $CO_2$ adsorption performance | 29.2 g | 16.3 g | 16.2 g | 32.3 g |

As shown in Table 4, the adsorbents for carbon dioxide according to Examples 1 to 4 have a desired level of adsorption performance at a temperature ranging from about 200° C. to about 400° C. The adsorbents for carbon dioxide according to Examples 1 to 4 also have a desired level of activity at a relatively high temperature.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

[Description of Symbols]
1: inorganic oxide porous structure
3: active compound
5: mesopore
10: adsorbent for carbon dioxide

What is claimed is:

1. An adsorbent for carbon dioxide, comprising:
an inorganic oxide porous structure having a plurality of mesopores; and
an active compound bound to a surface of the mesopores, the active compound selected from at least one of an alkali metal-containing compound and an alkaline-earth metal-containing compound, the adsorbent having a particle diameter size of about 0.01 micrometer to about 1 micrometer.

2. The adsorbent for carbon dioxide of claim 1, wherein the mesopores have an average pore diameter of about 2 nm to about 50 nm.

3. The adsorbent for carbon dioxide of claim 1, wherein the inorganic oxide porous structure is selected from at least one of silica, alumina, titania, zirconia, tin oxide, cobalt oxide, zinc oxide, indium oxide, nickel oxide, hafnium oxide, and vanadium oxide.

4. The adsorbent for carbon dioxide of claim 1, wherein the inorganic oxide porous structure is a mesoporous particle having a pore volume of about 0.1 $cm^3$/g to about 2 $cm^3$/g.

5. The adsorbent for carbon dioxide of claim 1, wherein the active compound is a salt including a metal selected from at least one of an alkali metal and an alkaline-earth metal.

6. The adsorbent for carbon dioxide of claim 5, wherein
the alkali metal is selected from at least one of lithium (Li), sodium (Na), potassium (K), rubidium (Rb), and cesium (Cs), and
the alkaline-earth metal is selected from at least one of magnesium (Mg), calcium (Ca), strontium (Sr), and barium (Ba).

7. The adsorbent for carbon dioxide of claim 5, wherein the salt is selected from at least one of a halide, a hydroxide, a nitrate, a chlorinate, a sulfate, a phosphate, a carbonate, and a carboxylate.

8. The adsorbent for carbon dioxide of claim 1, wherein the active compound is present in an amount of about 0.01 to about 3 moles based on 1 mole of the inorganic oxide porous structure.

9. The adsorbent for carbon dioxide of claim 1, wherein the active compound comprises a halide including an alkali metal or an alkaline earth metal, the adsorbent exhibiting crystalline peaks of the active compound in an X-ray diffraction analysis, and the mesopores having an average pore diameter of 10 nm to 40 nm.

10. The adsorbent for carbon dioxide of claim 1, wherein the plurality of mesopores constitute at least 60% of total pores of the inorganic oxide porous structure.

11. The adsorbent for carbon dioxide of claim 1, wherein the adsorbent has a specific surface area ranging from about 100 to 500 $m^2/g$.

12. A capture module for carbon dioxide comprising the adsorbent for carbon dioxide according to claim 1.

* * * * *